US009191571B2

(12) United States Patent
Nakai et al.

(10) Patent No.: US 9,191,571 B2
(45) Date of Patent: Nov. 17, 2015

(54) IMAGE CAPTURE APPARATUS THAT CONTROLS PHOTOGRAPHING ACCORDING TO PHOTOGRAPHIC SCENE

(71) Applicant: CASIO COMPUTER CO., LTD., Shibuya-ku, Tokyo (JP)

(72) Inventors: Takao Nakai, Tokyo (JP); Takeshi Tsukagoshi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/189,614

(22) Filed: Feb. 25, 2014

(65) Prior Publication Data
US 2014/0240531 A1 Aug. 28, 2014

(30) Foreign Application Priority Data

Feb. 28, 2013 (JP) .................................. 2013-039555

(51) Int. Cl.
*H04N 5/222* (2006.01)
*H04N 5/232* (2006.01)

(52) U.S. Cl.
CPC ....... *H04N 5/23219* (2013.01); *H04N 5/23222* (2013.01); *H04N 5/23293* (2013.01)

(58) Field of Classification Search
CPC .......... H04N 5/23216; H04N 5/23219; H04N 5/23245; H04N 5/23293
USPC ....................................... 348/333.01–333.04
See application file for complete search history.

(56) References Cited

U.S. PATENT DOCUMENTS

| | | | |
|---|---|---|---|
| 2007/0153111 A1* | 7/2007 | Kato | 348/333.11 |
| 2008/0088710 A1 | 4/2008 | Iwamoto et al. | |
| 2009/0073285 A1* | 3/2009 | Terashima | 348/231.99 |
| 2009/0201390 A1 | 8/2009 | Mimura et al. | |
| 2010/0026836 A1* | 2/2010 | Sugimoto | 348/223.1 |
| 2010/0079589 A1* | 4/2010 | Yoshida et al. | 348/81 |
| 2011/0007177 A1* | 1/2011 | Kang | 348/222.1 |
| 2011/0074971 A1* | 3/2011 | Kwon | 348/222.1 |

(Continued)

FOREIGN PATENT DOCUMENTS

| | | |
|---|---|---|
| JP | 2008-167273 A | 7/2008 |
| JP | 2009-194437 A | 8/2009 |
| JP | 2010057168 A | 3/2010 |

(Continued)

OTHER PUBLICATIONS

Japanese Office Action dated Dec. 24, 2014, issued in counterpart Japanese Application No. 2013-039555.

*Primary Examiner* — Kelly L Jerabek
(74) *Attorney, Agent, or Firm* — Holtz, Holtz, Goodman & Chick PC

(57) ABSTRACT

An image capture apparatus according to the present invention includes: sequentially estimating a photographic scene; sequentially setting, based on the photographic scene sequentially estimated, a photographic scene that serves as a basis for judging a photographic condition; sequentially displaying, based on the photographic scene sequentially set, scene identification information indicating the photographic scene being set; and controlling, for each photographic scene, an update condition for determining an update timing of the photographic scene set by the scene setting unit or an update timing of the photographic scene displayed by the scene display unit, so that, with this configuration, it is possible to preferably set a timing or a condition relating to setting.

10 Claims, 9 Drawing Sheets

(56) References Cited

U.S. PATENT DOCUMENTS

2012/0133730 A1    5/2012  Ino
2014/0028885 A1\*  1/2014  Ma et al. .................. 348/333.01

FOREIGN PATENT DOCUMENTS

| | | |
|---|---|---|
| JP | 2010-273167 A | 12/2010 |
| JP | 2012119875 A | 6/2012 |

\* cited by examiner

FIG. 2A
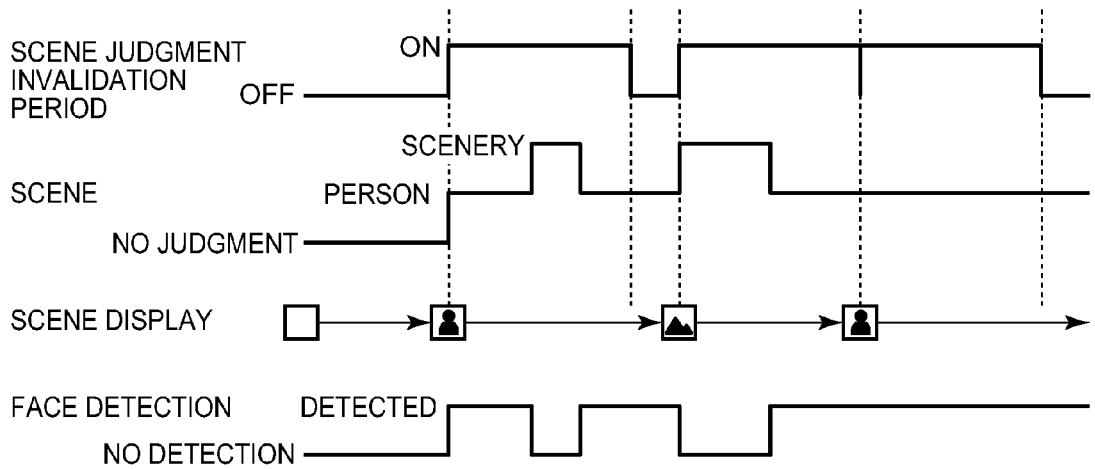
FIG. 2B
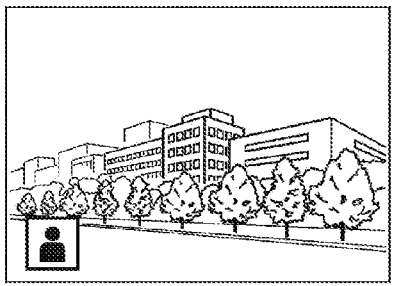
FIG. 2C
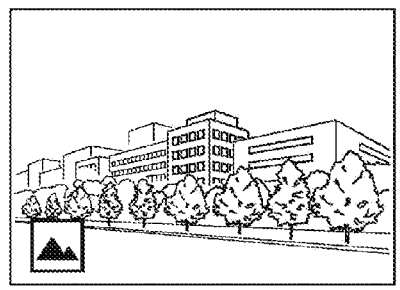

FIG. 3A
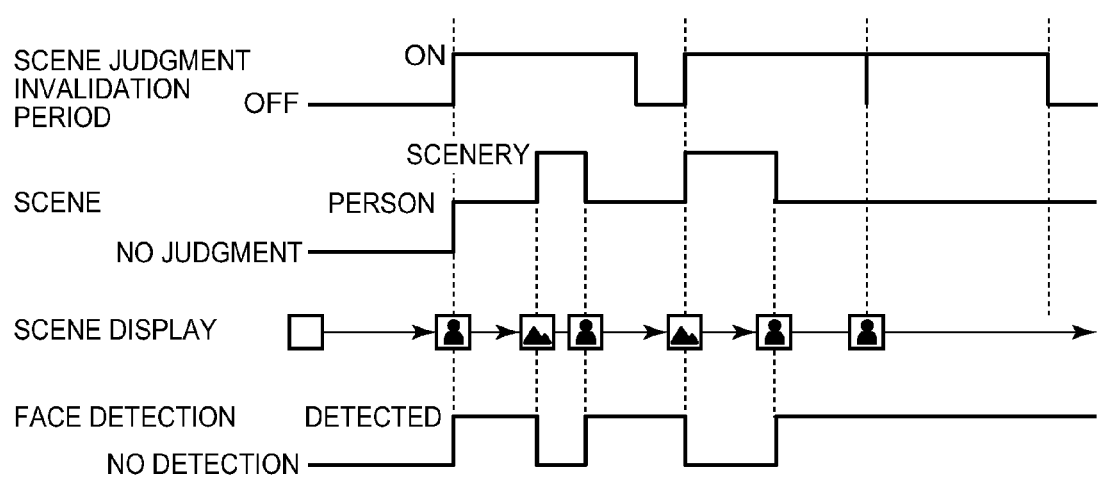
FIG. 3B
⇩
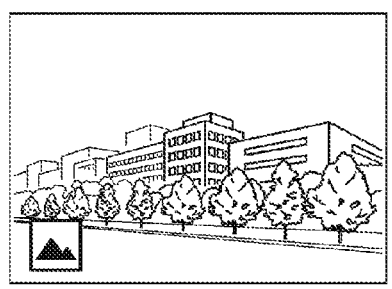
⇩
FIG. 3C
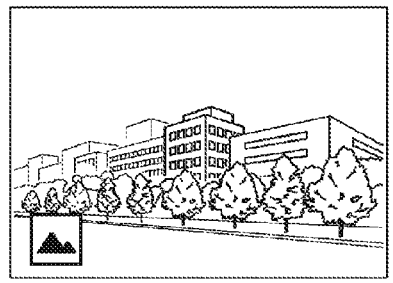
⇩
⇩

FIG. 5A

PHOTOGRAPHIC SCENE JUDGMENT TABLE

| SCENE CANDIDATE | JUDGMENT CONDITION | UPDATE CONDITION |
|---|---|---|
| PERSON | FACE DETECTION: PRESENT | REALTIME |
| LOW LIGHT | LV: NO MORE THAN 4 OR LOW LIGHT MAY CONTINUE WITH LV OF 4 TO 5 | ONE SECOND FOR SCENE SETTING INVALIDATION PERIOD |
| BACKLIGHT | BRIGHTNESS DISTRIBUTION: LOCAL<br>FACE DETECTION: DETECTED COORDINATE X: A, Y: B<br>LV: HIGH<br>CONTINUE FOR NO LESS THAN 15 FRAMES | |
| SKY | LV: HIGH<br>BLUE AREA: LARGE<br>SUBJECT DISTANCE: ∞ | |
| SCENERY | LV: HIGH<br>SUBJECT DISTANCE: ∞<br>JUDGMENT LIGHT SOURCE: NATURAL LIGHT<br>CONTINUE NO LESS THAN 5 FRAMES | |
| ACTION | JUDGMENT CONDITION 1 OF ACTION CONTINUES FOR NO LESS THAN 10 FRAMES | |
| ⋮ | ⋮ | ⋮ |

FIG. 5B

DISPLAY MANAGEMENT TABLE OF JUDGMENT ITEMS

| JUDGMENT ITEMS | PRESENCE/ABSENCE OF STATE DISPLAY | STATE DISPLAY CONTENTS |
|---|---|---|
| FACE DETECTION | DISPLAY | DISPLAYING FRAME AT POSITION DETECTED |
| BRIGHTNESS DISTRIBUTION | UNDISPLAYABLE | UNDISPLAYABLE |
| LV | UNDISPLAYABLE | UNDISPLAYABLE |
| BLUE AREA | UNDISPLAYABLE | UNDISPLAYABLE |
| SUBJECT DISTANCE | NON-DISPLAY | DISTANCE MARK DISPLAY |
| JUDGMENT LIGHT SOURCE | NON-DISPLAY | LIGHT SOURCE MARK DISPLAY |
| ⋮ | ⋮ | ⋮ |

FIG. 5C

PHOTOGRAPHIC CONDITION TABLE

| PHOTOGRAPHIC SCENE | PHOTOGRPAHIC CONDITION | ICON |
|---|---|---|
| PERSON | SHUTTER SPEED: HIGH, APERTURE: SMALL, SKIN COLOR CORRECTION: ON | ICON IMAGE 1 |
| LOW LIGHT | FLASH EMISSION: ON | ICON IMAGE 2 |
| BACKLIGHT | EXPOSURE COMPENSATION: ON | ICON IMAGE 3 |
| SKY | ⋮ | ICON IMAGE 4 |
| SCENERY | ⋮ | ICON IMAGE 5 |
| ACTION | ⋮ | ICON IMAGE6 |
| PERSON & LOW LIGHT | ⋮ | ICON IMAGE 7 |
| PERSON & SKY | ⋮ | ICON IMAGE 8 |
| ⋮ | ⋮ | ⋮ |

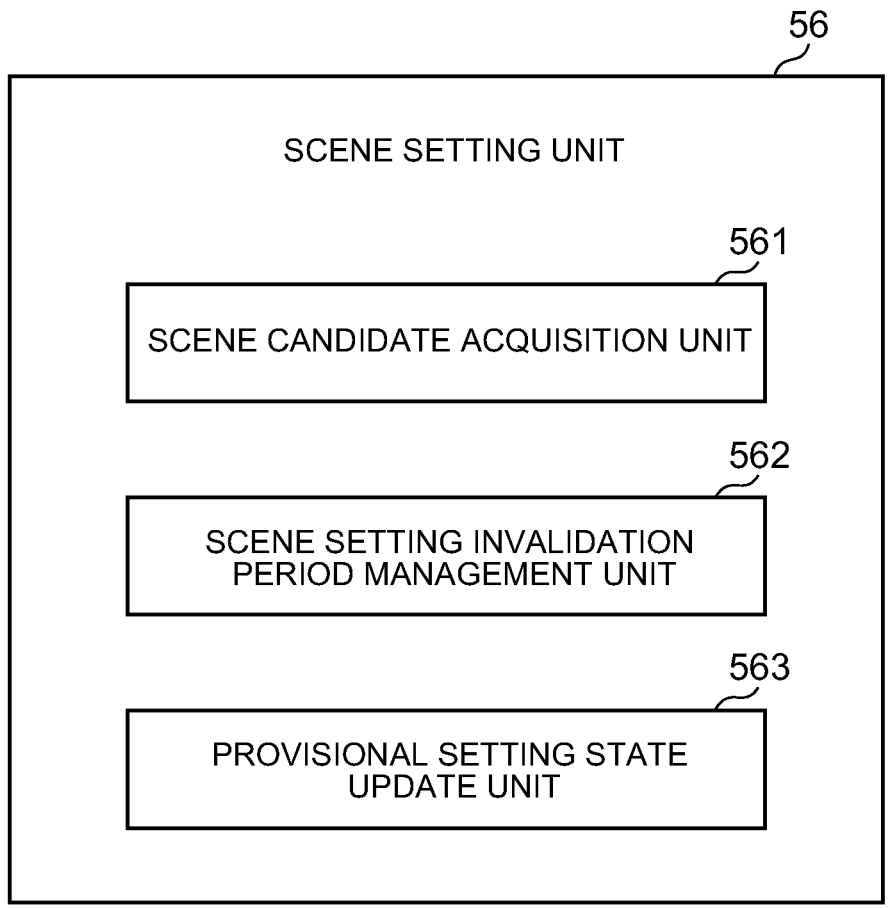

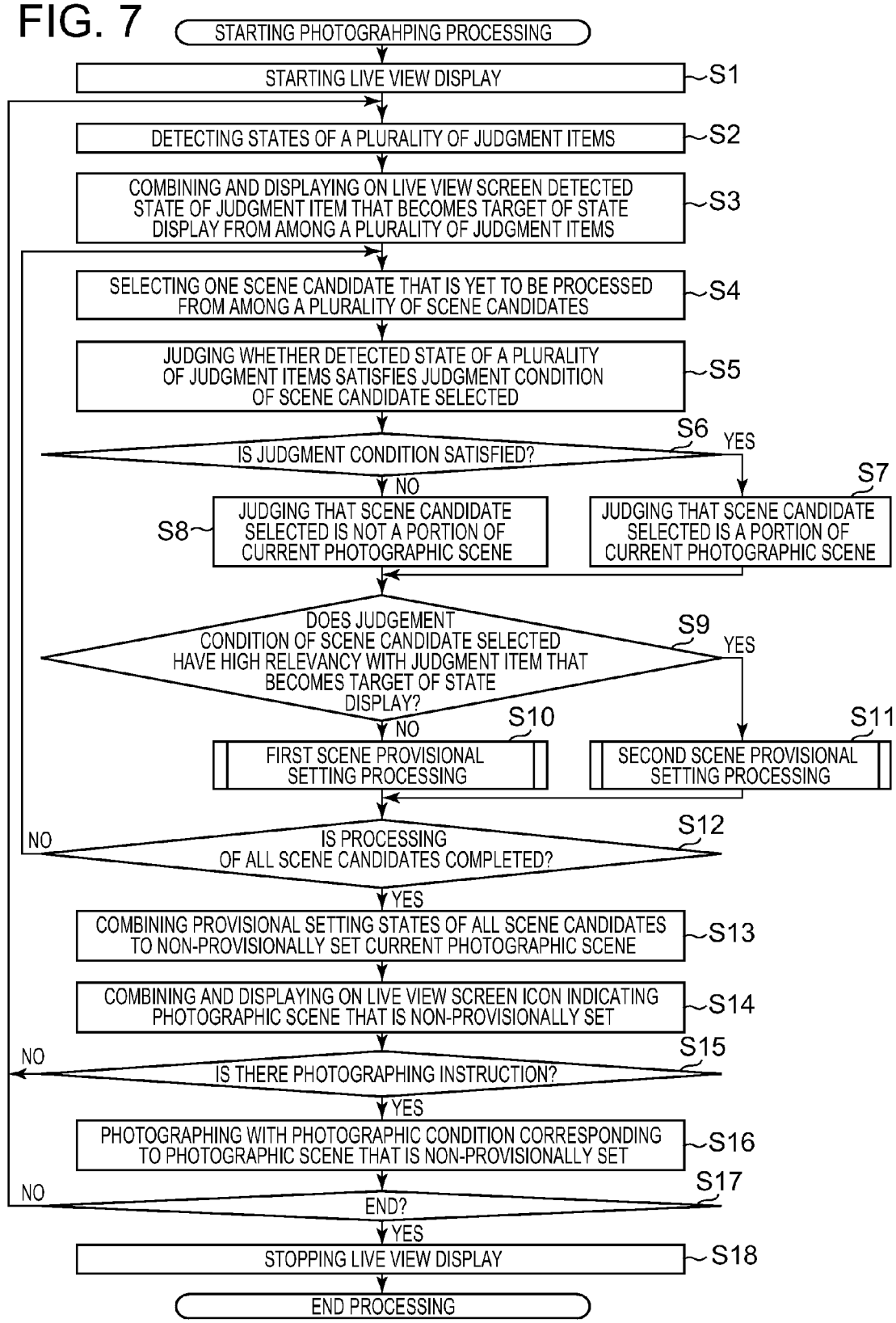

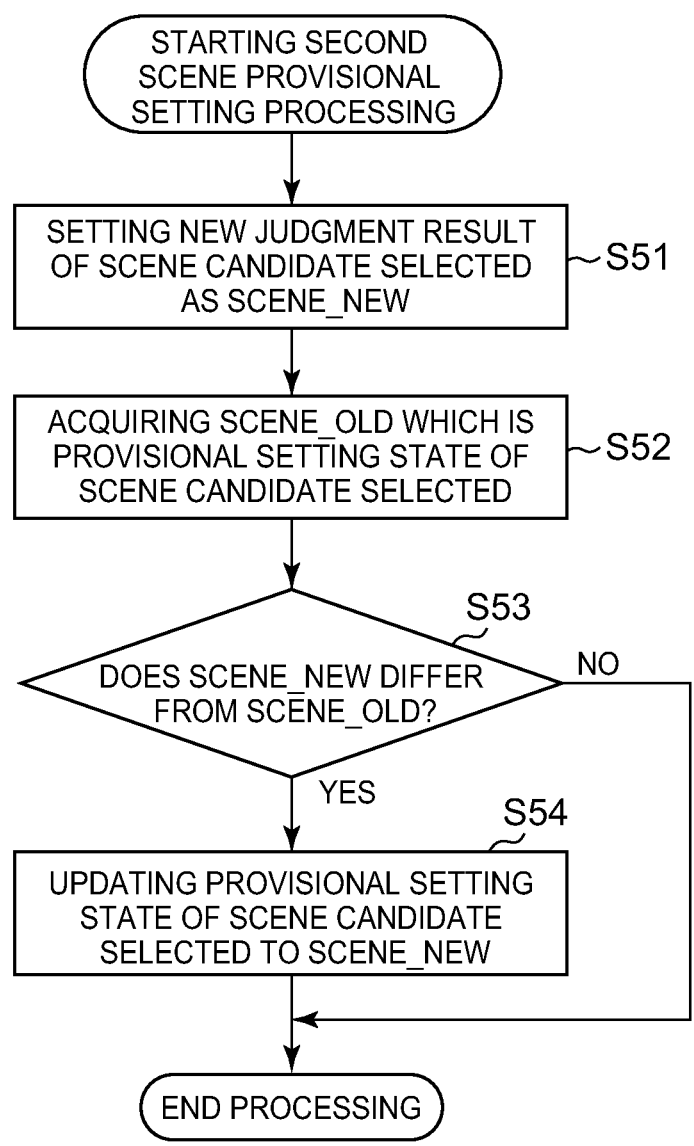

IMAGE CAPTURE APPARATUS THAT CONTROLS PHOTOGRAPHING ACCORDING TO PHOTOGRAPHIC SCENE

This application is based on and claims the benefit of priority from Japanese Patent Application No. 2013-039555, filed on 28 Feb. 2013, the content of which is incorporated herein by reference.

BACKGROUND OF THE INVENTION

1. Field of the Invention

The present invention relates to an image capture apparatus that controls photographing according to a photographic scene, a display control method, and a program (storage medium).

2. Related Art

Conventionally, a technology has been known which, in an image capture apparatus such as a digital camera, detects a portion of a photographed environment, sets a photographed environment detected as a predetermined photographic scene if the photographed environment detected satisfies a predetermined condition so that preferable photographing can be performed according to the photographed environment thus detected, and photographs based on various settings for photographing by the image capture apparatus corresponding to the photographic scene (hereinafter, also referred to as "photographic condition") (Japanese Unexamined Patent Application, Publication. No. 2010-273167).

In Japanese Unexamined Patent Application, Publication. No. 2010-273167, technology has been disclosed which determines as a predetermined photographic scene if a photographic scene satisfies a predetermined condition and displays an icon image of the photographic scene as a determination result, etc. on a display unit of the image capture apparatus so as to inform a user.

SUMMARY OF THE INVENTION

An aspect of the present invention is an image capture apparatus comprising: a scene estimate unit that sequentially estimates a photographic scene; a scene setting unit that, based on the photographic scene sequentially estimated, sequentially sets a photographic scene that serves as a basis for judging a photographic condition; a scene display unit that, based on the photographic scene sequentially set, sequentially displays scene identification information indicating the photographic scene being set; and an update condition control unit that controls, for each photographic scene, an update condition for determining an update timing of the photographic scene set by the scene setting unit or an update timing of the photographic scene displayed by the scene display unit.

Another aspect of the present invention is a display control method executed by an image capture apparatus including a display unit, comprising the steps of: sequentially estimating a photographic scene; sequentially setting, based on the photographic scene sequentially estimated, a photographic scene that serves as a basis for judging a photographic condition; sequentially displaying, based on the photographic scene sequentially set, scene identification information indicating the photographic scene being set; and controlling, for each photographic scene, an update condition for determining an update timing of the photographic scene set by the scene setting unit or an update timing of the photographic scene displayed by the scene display unit.

Still Another aspect of the present invention is a non-transitory storage medium encoded with a computer-readable program that enables a computer controlling an image capture apparatus including a display unit to execute functions as: a scene estimate unit that sequentially estimates a photographic scene; a scene setting unit that, based on the photographic scene sequentially estimated, sequentially sets a photographic scene that serves as a basis for judging a photographic condition; a scene display unit that, based on the photographic scene sequentially set, sequentially displays scene identification information indicating the photographic scene being set; and an update condition control unit that controls, for each photographic scene, an update condition for determining an update timing of the photographic scene set by the scene setting unit or an update timing of the photographic scene displayed by the scene display unit.

BRIEF DESCRIPTION OF THE DRAWINGS

FIGS. 2A to 2C are schematic diagrams for explaining a conventional photographic scene display;

FIGS. 3A to 3C are schematic diagrams for explaining a photographic scene display of the present embodiment;

FIGS. 5A to 5C are diagrams showing various tables stored in a storage unit;

FIG. 6 is a functional block diagram showing a functional configuration for executing provisional setting processing among the photographing processing;

FIG. 7 is a flowchart explaining a flow of photographing processing executed by the image capture apparatus of FIG. 1 having the functional configuration of FIG. 4;

FIG. 9 is a flowchart showing a detailed flow of second scene provisional setting processing among the photographing processing of FIG. 7.

DETAILED DESCRIPTION OF THE INVENTION

Figure 1:
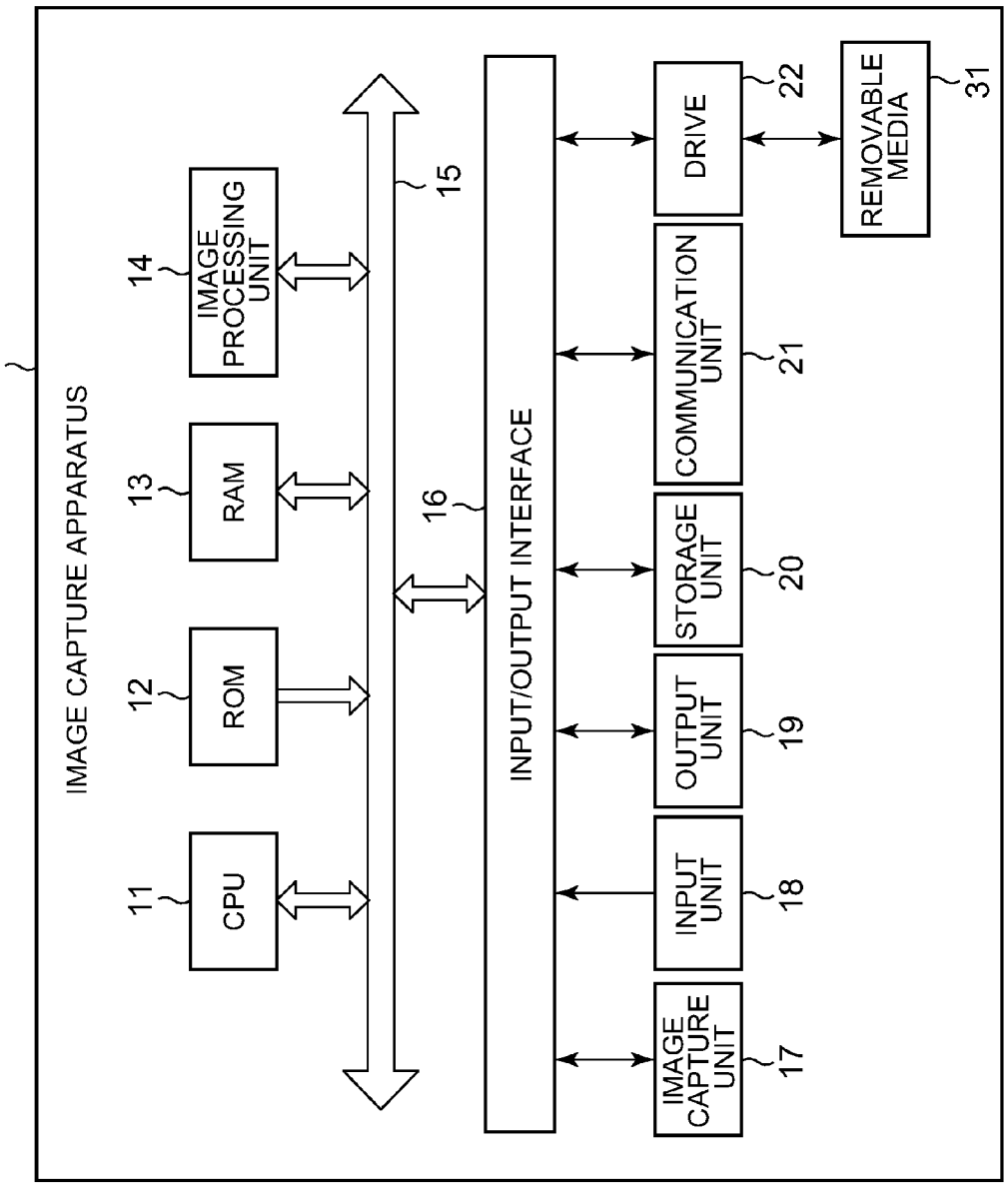
FIG. 1 is a block diagram showing a hardware configuration of an image capture apparatus according to an embodiment of the present invention.

FIG. 1 is a block diagram showing a hardware configuration of an image capture apparatus 1 according to an embodiment of the present invention.

The image capture apparatus 1 is configured as, for example, a digital camera.

The image capture apparatus 1 includes a CPU (Central Processing Unit) 11, ROM (Read Only Memory) 12, RAM (Random Access Memory) 13, an image processing unit 14, a bus 15, an Input/Output interface 16, an image capture unit 17, an input unit 18, an output unit 19, a storage unit 20, a communication unit 21, and a drive 22.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The image processing unit 14 is configured with a DSP (Digital Signal Processor), VRAM (Video Random Access Memory), and the like, and cooperates with the CPU 11 to perform various image processing on data of an image.

The CPU 11, the ROM 12 and the RAM 13 are connected to one another via the bus 15. The input/output interface 16 is also connected to the bus 15. The image capture unit 17, the input unit 18, the output unit 19, the storage unit 20, the communication unit 21, and the drive 22 are connected to the input/output interface 16.

The image capture unit 17 includes an optical lens unit and an image sensor, which are not shown.

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The optical lens unit also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 17.

Such an output signal of the image capture unit 17 is hereinafter referred to as "data of a captured image". Data of a captured image is supplied to the CPU 11, RAM 13, the image processing unit 14, and the like as appropriate.

The input unit 18 is configured by various buttons and inputs a variety of information in accordance with instruction operations by the user.

The output unit 19 is configured by the display unit, a speaker, and the like, and outputs images and sound.

The storage unit 20 is configured with hard disk, DRAM (Dynamic Random Access Memory) or the like, and stores data of various images.

The communication unit 21 controls communication with other devices (not shown) via networks including the Internet.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 20, as necessary. Similarly to the storage unit 20, the removable medium 31 can also store a variety of data such as the image data stored in the storage unit 20.

The image capture apparatus 1 including the above such configuration has functions of causing the output unit 19 to perform live view display during photographing and perform display showing a photographing condition in a superimposed manner on the live view display (a state display and a photographic scene display).

The "live view display" refers to sequentially reading data of each captured image that is temporarily recorded in memory during photographing and sequentially displaying each captured image on the output unit 19. Here, each captured image sequentially displayed on the output unit 19 refers to "live view image".

Furthermore, the "state display" is a portion of a photographed environment and refers to a state display of an element as a judgment condition of a photographic scene (hereinafter, referred to as "judgment item"). For example, the state display includes a state display of "face detection" indicating that there is a human face in a photographing area, a state display of "subject distance" showing a distance to a subject in a photographing area, a state display of "judgment light source" showing that there is a light source in a photographing area, and the like. More specifically, in a case of the state display of "face detection", for example, a result of the face detection is displayed so as to be superimposed with a frame image on a location corresponding to a face in the live view image. In a case of the state display of "subject distance", for example, an indicator image showing a numerical value of a distance to a subject, an icon image indicating similarity, etc. are displayed so as to be superimposed on a partial area of the live view image. In a case of being the state display of "judgment light source", an icon image indicating that there is a light source, etc. is displayed so as to be superimposed on a partial area of the live view image.

The judgment items of such state displays are detected by, for example, a sensor, etc., or analyzing the live view image.

Furthermore, the "photographic scene display" is a photographic scene display that is set in a case in which a judgment item satisfies a predetermined condition. With the image capture apparatus 1, a photographic scene that has been set is associated with a predetermined photographic condition and photographing is preferably performed with respect to a photographed environment specified by the photographic scene.

Such a photographic scene display displays an icon image schematically showing a photographic scene so as to be superimposed on a partial area of the live view image.

Therefore, with the image capture apparatus 1 performing the live view display, the state display, and the photographic scene display, it is possible for a user to visually understand a photographed environment with a dynamic live view image sequentially displayed on the output unit 19, while it is also possible to check cognitive condition for a photographed environment on an apparatus side by way of icon images, etc., of a state display and a photographic scene.

With the conventional image capture apparatus 1 having such functions as described above, the photographic scene is set by judging whether a predetermined judgment item from among a plurality of judgment items detected satisfies a predetermined condition. Therefore, in a case in which a photographed environment often changes or a photographed environment is in a questionable state for setting a photographic scene (for example, in a state close to a threshold value for judgment), if a photographic scene thus judged were immediately set unconditionally to display the photographic scene, a setting condition for the photographic scene often would change, a result of which a photographing operation would become unstable and an icon images, etc., performing the photographic scene display would also often change, which would cause flickering on a screen display, a result of which it may cause a user to feel uncomfortable.

Given this situation, upon judging (estimating) the photographic scene, it is configured so as to employ a predetermined condition for scene judgment in which, for example, hysteresis is provided for a threshold value to judge a predetermined judgment item, or a photographic scene is not judged (estimated) until a state in which a predetermined judgment item satisfies a predetermined state continues for no less than a predetermined time period. In the present embodiment, an event of the state in which a predetermined judgment item satisfies a predetermined state continuing for no less than 5 to 15 frames (1/30 seconds per frame) is set as a condition for scene judgment.

In this way, it is possible to avoid misjudgment due to temporary change (flicker) of a photographed environment or noise upon detection by delaying a threshold value or timing for scene judgment.

Although it is possible to improve the instability of the photographing operation as described above or the uncomfortable feeling imparted to the user more or less with such processing, it is not sufficient.

Given this situation, upon setting the photographic scene, it is further configured so as to invalidate the photographic scene setting unless a predetermined time period (hereinafter, referred to as "scene setting invalidation period") lapses from the time when the photographic scene changed, even in a case in which the photographic scene thus judged (estimated) changed upon setting the photographic scene. In the present embodiment, the scene setting invalidation period is set to approximately one second.

In this way, since the scene setting invalidation period is provided, the photographic scene setting in the scene setting invalidation period is invalidated, and thus it is possible to reduce the instability of the photographic operation due to a setting condition of the photographic scene often changing or flickering on the screen display due to a display of the photographic scene changing. The processing of delaying a threshold value or timing of the abovementioned scene judgment has a purpose of avoiding misjudgment due to temporary change (flicker) of a photographed environment or noise upon detection. On the other hand, the processing of providing the scene setting invalidation period allows for the efficient reduction of the instability of the photographic operation due to a setting condition of the photographic scene often changing or flickering on the screen display due to a display of the photographic scene changing.

It should be noted that, in a case in which the main purpose is not to avoid the instability of the photographic operation, but rather to reduce flickering on the screen display, it may be configured so as to provide a scene display switching invalidation period in order to control a timing at which a photographic scene display is switched upon displaying the photographic scene, instead of providing the scene setting invalidation period upon setting the photographic scene.

FIG. 2 is a schematic diagram for explaining a conventional photographic scene display. It should be noted that, in the example of FIG. 2, there are a plurality of configurable photographic scenes, which include "no judgment", "person", and "scenery", for example.

For a photographic scene of "person", only a judgment item of "face detection", which indicates that a human face is detected, is set as a judgment condition for photographic scene. The judgment item of the "face detection" is also a target for the state display. That is to say, the live view display and the photographic scene display as well as the state display are performed when "face detection" is done.

Furthermore, for the photographic scene of "no judgment", a case in which any judgment item is not detected or a case in which a judgment item detected does not correspond to a condition for any photographic scene is selected. Here, the live view display and the photographic scene display are performed.

Furthermore, the photographic scene of "scenery" is selected in a case in which a plurality of judgment items corresponds to a predetermined condition. A judgment item, which becomes a condition for "scenery", does not serve as a target for the state display. Here, the live view display and the photographic scene display are performed.

More specifically, as shown in an example of FIG. 2A, the photographic scene display with "no judgment" is performed since a condition for a photographic scene is not satisfied. When "face detection" is done, since it satisfies a condition for the photographic scene of "person", the photographic scene display of "person" is performed. Then, since the photographic scene is switched from "no judgment" to "person", a scene setting invalidation period is set during which a change of the photographic scene display is not possible. In this example, a judgment of "scenery" is made since it satisfies a condition for a photographic scene during the scene setting invalidation period with the photographic scene display of "person"; however, the judgment is made during the scene setting invalidation period, the photographic scene display of "person" is maintained.

Then, a judgment of the photographic scene of "person" is made again during the scene setting invalidation period, and the photographic scene display of "person" is still maintained. As shown in FIG. 2B, regarding this state, when the "face detection" is initially done, the state display of "face detection", i.e. a frame image superimposed on a face, is displayed, and the photographic scene display of "person", i.e. a human-figure icon image corresponding to the photographic scene, is displayed. Then, even when the frame image becomes not displayed in a state in which "face detection" is not being done, the human-figure icon image corresponding to the photographic scene display of "person" is still displayed, a result of which the state display and the photographic scene display become inconsistent. Then, when "face detection" is done again, the frame image is displayed again, a result of which the state display and the photographic scene display of "person" become consistent.

Furthermore, as shown in FIG. 2A, since the scene setting invalidation period lapses after the abovementioned transition and it satisfies a condition and the photographic scene of "scenery" is set again, the photographic scene display of "scenery" is performed. Subsequently, since the judgment of the photographic scene of "person" is made in the scene setting invalidation period and the judgment is still maintained even after the scene setting invalidation period lapses, the photographic scene display of "person" continues to be performed. Thereafter, the scene setting invalidation starts again and the following photographic scene display of "person" is performed.

As shown in FIG. 2C, regarding this state, when there is no person and "face detection" is not done, the photographic scene display of "scenery", i.e. a mountain-figure icon image, is displayed; however, even when a person appears and "face detection" is done thereafter, the photographic scene display of "scenery" continues to be displayed. Therefore, the frame image which is the state display of "face detection" and the mountain-figure icon image which is the photographic scene display are displayed, a result of which the display becomes inconsistent. Then, when a predetermined period lapses, the frame image and the human-figure icon image are displayed, and the scene changes to the photographic scene display of "person".

During the transition of the photographed environment as described above, since the scene setting invalidation period is set, a user is not given an uncomfortable feeling due to flickering on a screen. However, when it comes to the aspect of state display, an inconsistency may occur between the photographic scene display and the state display, a result of which a user may be given a feeling of suspicion about the delay of change of the photographic scene display from the state display or the delay of change of the photographic scene display from a state in which the state display becomes not displayed.

FIG. 3 is a schematic diagram for explaining a photographic scene display of the present embodiment.

Different from the conventional examples, in the example of FIG. 3A of the image capture apparatus 1 according to the present embodiment, in a case of a photographic environment similar to the conventional case of FIG. 2A, "face detection" is initially done, and when the judgment of the photographic scene of "scenery" is made after the photographic scene display of "person" is displayed, the display is changed to the photographic scene display of "scenery" regardless of being during the scene setting invalidation period with the photographic scene display of "person" in order to avoid the photographic scene display of "person" without the state display of "face detection".

In other words, in the image capture apparatus 1 according to the present embodiment, as shown in FIG. 3B, in a case in which "face detection" is not done, i.e. the state display becomes not displayed, the display is changed from the photographic scene display of "person" to the photographic scene display of "scenery".

Furthermore, in a case in which "face detection" is done during the scene setting invalidation period with the photographic scene display of "scenery" thereafter, since the inconsistency between the state display of "face detection" and the photographic scene of "scenery" occurs, the photographic scene display of "scenery" is changed to the photographic scene display of "person" regardless of the scene setting invalidation period.

In other words, as shown in FIG. 3C, in a state in which "face detection" is not done and the frame image does not appear, the mountain-figure icon image is displayed as the photographic scene display of "scenery". Thereafter, when a person appears and "face detection" is done and the frame image appears, the human-figure icon image, which is the photographic scene display of "person", is accordingly displayed. In this way, the state display and the photographic scene display are displayed in a consistent manner.

The image capture apparatus 1 according to the present embodiment has functions of reducing flickering on a screen display due to the photographic scene display often changing as described above, as well as avoiding the inconsistency between the photographic scene display and the state display.

The image capture apparatus 1 according to the present embodiment having the functions as described above is described below.

Figure 4:
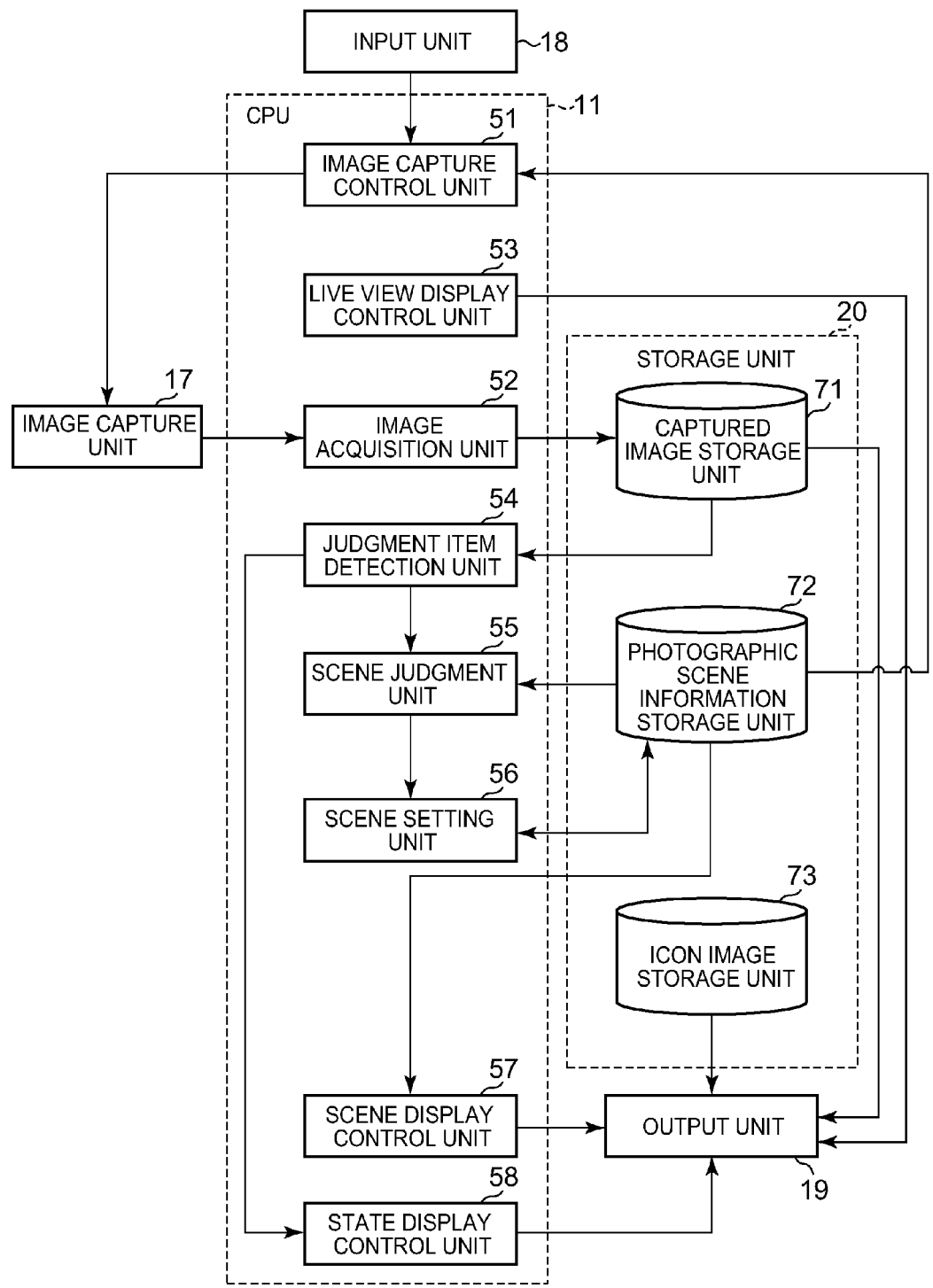
FIG. 4 is a functional block diagram showing a functional configuration for executing such photographing processing among the functional configurations of the image capture apparatus.

FIG. 4 is a functional block diagram showing a functional configuration for executing such photographing processing among the functional configurations of the image capture apparatus 1.

"Photographing processing" refers to a sequence of processing of performing live view display on the output unit 19 using a captured image acquired from the image capture unit 17, performing the state display and the photographing scene display on the output unit 19 from among judgment items detected by analyzing a captured image thus acquired, and performing photographing with the settings of a photographing condition based on the photographic scene thus set.

In the present embodiment, a photographic scene is configured so as to combine a plurality of photographic scenes into one photographic scene. For example, if it is judged that a photographic scene A and a photographic scene B can be set, a photographic scene is set as one that is produced by the photographic scene A being combined with the photographic scene B. More specifically, if the photographic scene of "person" and the photographic scene of "sky" can be set, a photographic scene of "person & sky" is set.

Therefore, a (non-provisional) setting of a photographic scene in "photographing processing" is performed by judging whether each scene can be a candidate for a photographic scene, provisionally setting candidates for photographic scenes sequentially, and combining the candidates that are set provisionally upon the completion of the judgment processing for all of the candidates for the photographic scenes.

In a case of executing the photographing processing, an image capture control unit 51, an image acquisition unit 52, a live view display control unit 53, a judgment item detection unit 54, a scene judgment unit 55, a scene setting unit 56, a scene display control unit 57, and a state display control unit 58 function in the CPU 11.

It should be noted that it is not particularly necessary for each function of the image capture control unit 51, the image acquisition unit 52, the live view display control unit 53, the judgment item detection unit 54, the scene judgment unit 55, the scene setting unit 56, the scene display control unit 57, and the state display control unit 58 to be built into the CPU 11 as in the present embodiment, and at least a part of each of these functions can be assumed by the image processing unit 14.

As an area in the storage unit 20, a captured image storage unit 71, a photographic scene information storage unit 72, and an icon image storage unit 73 are provided.

In the captured image storage unit 71, data of a captured image outputted from the image capture unit 17 is stored temporarily. Data of the captured image stored temporarily in the captured image storage unit 71 is prepared for live view display as a live view image.

In the photographic scene information storage unit 72, information used for a judgment and setting of a photographic scene (hereinafter, referred to as "scene judgment information"), management information of a state display which indicates for which judgment item a state display is performed (hereinafter, referred to as "display management information"), and information of a photographic scene that is currently set (hereinafter, referred to as "photographic scene setting information") are stored.

In the present embodiment, "scene judgment information" is stored as a photographic scene judgment table in which a candidate for a photographic scene, a judgment condition for a judgment item corresponding to the candidate, and an update condition upon setting a photographic scene corresponding to the candidate are associated. The details for the scene judgment information are described later.

The "display management information" is stored as a display management table in which each judgment item, presence/absence of a state display, and a display form are associated. The details for the display management table are described later.

In the photographic scene information storage unit 72, information of the photographic scene thus set is stored. In other words, in the photographic scene information storage unit 72, information of the photographic scene that is currently employed which also includes photographic scenes that are provisionally set (hereinafter, referred to as "photographic scene setting information") is stored.

In the icon image storage unit 73, an icon image which becomes item identification information corresponding to a scene judgment item used for a state display and an icon image which becomes scene identification information corresponding to various scenes used for a photographic scene display are stored.

FIG. 5 is a diagram showing various tables stored in the storage unit 20.

FIG. 5A is a diagram showing a judgment table used for a judgment and setting of a photographic scene.

In the present embodiment, a photographic scene includes, for example, "person", "low light", "backlight", "sky", "scenery", "action" as a candidate (hereinafter, referred to as "scene candidate"). A judgment as to whether a predetermined judgment condition is satisfied for each scene candidate is made so as set as a photographic scene.

More specifically, for a case of "person", an event of "face detection" being "present" is set as a condition for a judgment.

Furthermore, for a case of "low light", a state in which "LV (light value)" is "no more than 4 or low light may continue with LV of 4 to 5" is set as a condition for a judgment.

Furthermore, for a case of "sky", a state in which "brightness distribution" is "local" and "LV" is "high", and a state in which these states "continue for no less than 15 frames" is set as a condition for a judgment.

Furthermore, for a case of "backlight", a state in which "LV" is "high" and "blue area" is "large", and "subject distance" is "∞" is set as a condition for a judgment.

Furthermore, for a case of "scenery", a state in which "LV" is "high" and "subject distance" is "∞", and "judgment light source" is "natural light" and a state in which these states "continue for no less than 15 frames" is set as a condition for a judgment.

Furthermore, for a case of "action", a state in which "motion vector is detected in a predetermined area and this state continues for no less than 10 frames" is set as a condition for a judgment.

In the present embodiment, in a case in which the above-mentioned condition for a judgment is satisfied, the "update condition" for a photographic scene is updated as "real time" for the case of "person" and as "one second for scene setting invalidation period" for the cases of "low light", "backlight", "sky", "scenery", and "action". In other words, in the case of "person", a judgment scene is immediately updated even during the scene setting invalidation period, and in the cases of "low light", "backlight", "sky", "scenery", and "action", the photographic scene is updated in a case in which the scene setting invalidation period continues one second after the end of the scene setting invalidation period with the judgment scene previously updated.

Furthermore, regarding update condition, a scene candidate denoted by "real time" indicates that it is a photographic scene having a judgment condition of high relevancy with a state of a portion of judgment items that is a target for a state display. More specifically, in the case of "person", since only a state of a portion of the judgment items (face detection) that is a target for a state display is set as a condition for a judgment, the relevancy becomes the highest.

On the other hand, a scene candidate denoted by "one second for scene setting invalidation period" indicates that it is a photographic scene having a condition for a judgment of low relevancy with a state of a portion of judgment items that is a target for a state display.

Furthermore, the update condition can be arbitrarily set and changed by a user setting the level of the relevancy to set the update condition to "real time".

FIG. 5B is a diagram showing a display management table for managing a display of judgment items.

In the present embodiment, whether a judgment item is superimposed on a live view display in the display management table of a non-provisional judgment item is managed. In other words, the presence/absence of a display of a judgment item is judged with reference to the display management table of judgment items.

The "judgment items" include, for example, as shown in FIG. 5A, "face detection", "brightness distribution", "LV", "blue area", "subject distance", "judgment light source", and the like.

In the image capture apparatus 1 according to the present embodiment, the presence/absence of a state display is set to "display" for the case of "face detection", "undisplayable" for the case of "brightness distribution", "undisplayable" for the case of "LV", "undisplayable" for the case of "blue area", "non-display" for the case of "subject distance", and "non-display" for the case of "judgment light source". It should be noted that, in the judgment items denoted by the setting examples of "display" or "non-display", "display" and "non-display" are interchangeable according to a user operation or a mode setting; however, in the judgment items denoted by the setting example of "undisplayable", there is no margin for selecting presence/absence of display.

Furthermore, regarding state display contents (display method), "displaying frame at position detected" for displaying a frame image superimposed on a face is performed in the case of "face detection", "distance mark display" for displaying an icon image for a subject distance in the case of "subject distance" is performed, and "light source mark display" for displaying an icon image indicating presence/absence of a light source is performed in the case of "judgment light source".

In the present embodiment, only "face detection" from among the judgment items that can be displayed becomes a display target as a state display, and is set so that "displaying frame at position detected" is performed as a display method.

FIG. 5C is a diagram showing a photographic condition table for performing setting a photographic condition corresponding to a photographic scene set and displaying a display indicating a photographic scene set.

The photographic condition table is a table in which items of photographic scenes, photographic conditions for the photographic scenes, and icon images corresponding to the photographic scenes are associated.

For example, for the case of "person", conditions such as "shutter speed", "aperture", and "skin color correction" are imposed as photographic conditions at the time of photographing (automatically set) and an icon representing a person (for example, a symbol image that imitates a face, for example) is displayed. Furthermore, for the case of "low light", a condition of "flash emission: ON" is superimposed as a photographic condition at the time of photographing, and an icon representing low light (a symbol image that imitates a candle, for example) is displayed. Furthermore, for the case of "backlight", a condition of "exposure compensation" is imposed as a photographic condition at the time of photographing, and an icon representing backlight is displayed.

Referring back to FIG. 4, the image capture control unit 51 controls the image capture unit 17 to capture an image with a predetermined photographing condition in accordance with a photographing instruction from the input unit 18. More specifically, the image capture control unit 51 refers to the photographic condition table stored in the photographic scene information storage unit 72, based on a photographic scene that is currently set, and controls the image capture unit 17 to capture an image with a photographic condition corresponding to a photographic scene.

The image acquisition unit 52 acquires a captured image from the image capture unit 17, and outputs to the captured image storage unit 71.

The live view display control unit 53 controls the output unit 19 to output and display, as a live view image, a captured image that is temporarily stored in the captured image storage unit 71.

The judgment item detection unit 54 sequentially detects states of a plurality of judgment items used for a judgment for a photographic scene such as human face, brightness of photographic space, etc., from the captured image captured by the image capture unit 17.

Information detected by the judgment item detection unit 54 is used as information for displaying a judgment for a photographic scene and a state display.

The judgment item detection unit 54 outputs a detection result acquired by image analysis to the scene judgment unit 55 in order to provide the result for the judgment of the photographic scene, and outputs the result to the state display control unit 58 in order to provide the result to the state display.

The scene judgment unit 55 compares a state of a judgment item detected by the judgment item detection unit 54 (detection result) with scene judgment information stored in the photographic scene information storage unit 72 to judge a photographic scene (judgment of a photographic scene). In other words, the scene judgment unit 55 sequentially judges a photographic scene by comparing states of a plurality of judgment items that are sequentially detected by the judgment item detection unit 54 with judgment conditions of each photographic scene (judgment of a photographic scene).

Furthermore, the scene judgment unit 55 judges whether a judgment item according to a photographic scene judged serves as a target item of a state display. In other words, it is judged whether the relevancy between the judgment item according to the photographic scene thus judged and the target item of the state display is high or not. The judgment for the relevancy is made based on, for example, whether the judgment item which serves as s a judgment condition of a photographic scene has high relevancy with a judgment of a photographic scene. In other words, the scene judgment unit 55 judges that the relevancy is high in a case in which only a state of a portion of judgment items that serve as a target of a state display is set as a judgment condition.

More specifically, in a case in which the judgment item of the photographic scene of "person" is the presence/absence of "face detection" and in a case of "face detection: present" as well, it is judged that the relevancy is very high.

The scene setting unit 56 sets a photographic scene based on a judgment result of the scene judgment unit 55 and an update condition in the scene judgment information stored in the photographic scene information storage unit 72 (setting a photographic scene).

In other words, the scene setting unit 56 updates photographic scene setting information stored in the photographic scene information storage unit 72 in a case in which a photographic scene estimated by the scene judgment unit 55 satisfies a predetermined condition (for example, a case of being estimated for a predetermined period of time continuously, a case in which a predetermined condition is detected, or the like).

The scene setting unit 56 sequentially updates a photographic scene that is set as criteria for determining a photographic condition at a timing at which a changing condition of photographic scenes that are sequentially estimated satisfies a predetermined update condition (setting a photographic scene).

In this regard, the scene setting unit 56 updates (sets) a photographic scene using such an update condition that allows a photographic scene having a judgment condition with higher relevancy with a state of a portion of judgment items that serve as a target for a state display to update the photographic scene more quickly.

Furthermore, for a photographic scene having a judgment condition with higher relevancy with a state of a portion of judgment items that serve as a target for a state display, the scene setting unit 56 uses an update condition to inhibit photographic scene switching within a predetermined time period (a setting condition of a photographic scene) and, for a photographic scene having a judgment condition with lower relevancy with a state of a portion of judgment items that serve as a target for a state display, the scene setting unit 56 uses an update condition not to inhibit photographic scene switching within a predetermined time period (a setting condition of a photographic scene).

Furthermore, for an update condition for a plurality of photographic scenes having a judgment condition with lower relevancy with a state of a portion of judgment items that serve as a target for a state display (a setting condition), the scene setting unit 56 uses an update condition that inhibits photographic scene switching within a predetermined time period that is determined in common with the plurality of photographic scenes (for example, the scene setting invalidation period).

Furthermore, for example, in a case in which the photographic scene of "person" is switched with another photographic scene other than the photographic scene of "person" upon "face detection" for a portion of judgment items that serve as a target for a state display, the scene setting unit 56 switches a photographic scene that is currently set more quickly than the case in which the photographic scenes of "person" are switched with each other.

Furthermore, in the present embodiment, the scene setting unit 56 combines a plurality of photographic scenes that is provisionally set and sets as one photographic scene (non-provisionally).

The photographic scene set by the scene setting unit 56 is outputted to the photographic scene information storage unit 72. In the photographic scene information storage unit 72, information of the photographic scene set by the scene setting unit 56 is sequentially updated.

Furthermore, the scene setting unit 56 executes first provisional setting processing and second provisional setting processing for a provisional setting of a photographic scene.

The "first provisional setting processing" refers to a sequence of processing of provisionally setting a photographic scene in a case in which a judgment item having low relevancy with a target of a state display is detected.

The "second provisional setting processing" refers to a sequence of processing of provisionally setting a photographic scene in a case in which a judgment item having high relevancy with a target of a state display is detected.

Furthermore, the scene setting unit 56 includes a scene candidate acquisition unit 561, a scene setting invalidation period management unit 562, and a provisional setting state update unit 563. The scene candidate acquisition unit 561, the scene setting invalidation period management unit 562, and the provisional setting state update unit 563 are described later in detail.

The scene display control unit 57 controls the output unit 19 so as to display an icon image corresponding to a photographic scene stored in the icon image storage unit 73 based on the photographic scene setting information stored in the photographic scene information storage unit 72.

In the present embodiment, on the output unit 19, it is configured such that a live view image is displayed and an icon image is displayed on the live view image in a superimposed manner.

In other words, the scene display control unit 57 controls the output unit 19 so as to display an icon image showing a photographic scene that is sequentially updated while sequentially updating the icon image on a live view screen.

The state display control unit 58 controls the output unit 19 so as to display an icon image of a judgment item (item identification information) other than an icon image of a photographic scene for a predetermined judgment item among information of states of judgment items detected by the judgment item detection unit 54 (scene identification information). In other words, the state display control unit 58 controls the output unit 19 so as to output to display a portion of judgment items that serve as a target of a state display among a plurality of judgment items, while sequentially updating a detected state on a live view display screen.

FIG. 6 is a functional block diagram showing a functional configuration for executing such scene provisional setting processing (the first scene provisional setting processing and the second scene provisional setting processing) among photographing processing.

In the case of executing the scene provisional setting processing, the scene candidate acquisition unit 561, the scene setting invalidation period management unit 562, and the provisional setting state update unit 563 function in the CPU 11.

The scene candidate acquisition unit 561 acquires a new scene candidate and a current scene candidate.

More specifically, a new search result of a scene candidate selected is acquired as "Scene_new", and "Scene_old", which is a provisional setting state of a scene candidate selected, is acquired.

The scene setting invalidation period management unit 562 performs setting of a scene setting invalidation period and a period management. The setting of a scene setting invalidation period and the period management is performed by flag processing.

The provisional setting state update unit 563 performs updating to set a new scene candidate to be in a provisional setting state in a case of a new scene candidate differing from a current scene candidate. More specifically, the provisional setting state update unit 563 updates a provisional setting state to "Scene_new".

Next, with reference to FIG. 7, photographing processing executed by the image capture apparatus 1 with the functional configuration of FIG. 4 is described.

FIG. 7 is a flowchart explaining a flow of photographing processing executed by the image capture apparatus 1 of FIG. 1 having the functional configuration of FIG. 4.

The photographing processing starts when a predetermined operation is made on the input unit 18 by a user. Subsequently, in the image capture apparatus 1, the image capture unit 17 is controlled by the image capture control unit 51, and captured images are sequentially generated.

In Step S1, the output unit 19 starts live view display. More specifically, the image acquisition unit 52 outputs a captured image acquired from the image capture unit 17 to the captured image storage unit 71. The captured image storage unit 71 temporarily stores data of the captured image. The live view display control unit 53 controls the output unit 19 so as to sequentially output to display the data of the captured image that is temporarily stored in the captured image storage unit 71 as the live view display.

In Step S2, the judgment item detection unit 54 detects states of a plurality of judgment items. In other words, the judgment item detection unit 54 performs image analysis of the captured image acquired by the image acquisition unit 52 to detect a state of a scene condition item. More specifically, the judgment item detection unit 54 detects from a captured image, for example, a state that becomes a condition for constituting a scene such as face detection, light source, subject distance, etc.

In Step S3, the output unit 19 composites and displays a detected state of a judgment item that serves as a target of a state display from among a plurality of judgment items on the live view screen. In other words, the state display control unit 58 controls the output unit 19 so as to composite and display a state display of the judgment item detected by the judgment item detection unit 54 on the live view screen.

In Step S4, the scene judgment unit 55 selects one scene candidate that is yet to be processed, from among a plurality of scene candidates. In other words, the scene judgment unit 55 selects a scene candidate for a photographic scene to be judged subsequently from among scene candidates that are yet to be judged.

In Step S5, the scene judgment unit 55 judges whether detected states of a plurality of the judgment items satisfy a judgment condition of a scene candidate selected. In other words, the scene judgment unit 55 compares with the photographic scene judgment table stored in the photographic scene information storage unit 72 to judge whether the detected states of a plurality of the judgment items satisfy a judgment condition of a scene candidate selected.

In Step S6, the scene judgment unit 55 judges whether a judgment result satisfies a judgment condition of the scene. In other words, the scene judgment unit 55 performs a judgment as to whether a condition is satisfied as a result of the comparison with the photographic scene judgment table.

In a case of having judged that the detected states of a plurality of judgment items satisfies the judgment condition of the scene candidate selected, i.e. in a case of having judged that the scene candidate selected is not a portion of a current photographic scene, it is judged as YES in Step S6 and the processing advances to Step S7.

In Step S7, the scene judgment unit 55 judges that the scene candidate selected is at least a portion of the current photographic scene. Thereafter, the processing advances to Step S9. The processing of Step S9 and higher is described later.

On the other hand, in a case of having judged that the detected states of a plurality of judgment items do not satisfy a judgment condition of the scene candidate selected, i.e. in a case of having judged that the scene candidate selected is not a portion of a current photographic scene, it is judged as NO in Step S6 and the processing advances to Step S8.

In Step S8, the scene judgment unit 55 judges that the scene candidate selected is not at least a portion of the current photographic scene.

In Step S9, the scene judgment unit 55 judges whether the judgment condition of the scene candidate selected has high relevancy with a judgment item that serves as a state display. For example, the scene judgment unit 55 performs a judgment in which only a state of a judgment item that serves as a target of a state display is set to be a judgment condition, etc.

In a case of having judged that the judgment condition of the scene candidate selected has low relevancy with the judgment item that serves as a target of a state display, it is judged as NO in Step S9 and the processing advances to Step S10.

In Step S10, the scene setting unit 56 performs the first scene provisional setting processing. A detailed flow of the first scene provisional setting processing is described later.

On the other hand, in a case of having judged that the judgment condition of the scene candidate selected has high relevancy with the judgment item that serves as a target of a state display, it is judged as YES in Step S9 and the processing advances to Step S11.

In Step S11, the scene setting unit 56 performs the second scene provisional setting processing. A detailed flow of the second scene provisional setting processing is described later.

In Step S12, the scene setting unit 56 judges whether processing of all of the scene candidates has completed.

In a case in which the processing of all of the scene candidates has not completed, it is judged as NO in Step S12 and the processing returns to Step S4. Thereafter, the processing of Step S4 and higher is performed.

On the other hand, in a case in which the processing of all of the scene candidates has completed, it is judged as YES in Step S12 and the processing advances to Step S13.

In Step S13, the scene setting unit 56 combines provisional setting states of all of the scene candidates and non-provisionally sets as a current photographic scene.

In Step S14, the output unit 19 composites and displays an icon showing the photographic scene that was non-provisionally set on a live view screen. In other words, the scene display control unit 57 controls the output unit 19 so as to composite and display on a live view screen an icon image showing the photographic scene that was non-provisionally set that is stored in the icon image storage unit 73.

In Step S15, the image capture control unit 51 judges whether there was a photographing instruction by the input unit 18 being operated by pressing down.

In a case of having judged that there is no photographing instruction, it is judged as NO in Step S15 and the processing returns to Step S2. Thereafter, the processing of Step S2 and higher is performed.

In a case of having judged that there is a photographing instruction, it is judged as YES in Step S15 and the processing advances to Step S16.

In Step S16, the image capture unit 17 photographs with a photographic condition corresponding to the photographic scene that is non-provisionally set. In other words, the image capture control unit 51 controls the image capture unit 17 so as to photograph with a photographic condition corresponding to the photographic scene that is non-provisionally set, based on the photographic scene setting information stored in the photographic scene information storage unit 72.

In Step S17, the CPU 11 judges whether photographing has completed.

In a case of having judged that photographing has not completed, it is judged as NO in Step S17 and the processing returns to Step S2. Thereafter, the processing of Step S2 and higher is performed.

In a case of having judged that photographing has completed, it is judged as YES in Step S17 and the processing advances to Step S18.

In Step S18, the output unit 19 stops the live view display. In other words, the live view display control unit 53 controls the output unit 19 so as to stop the live view display. Subsequently, the photographing processing ends.

Next, the first scene provisional setting processing among the photographing processing of FIG. 7 is explained.

Figure 8:
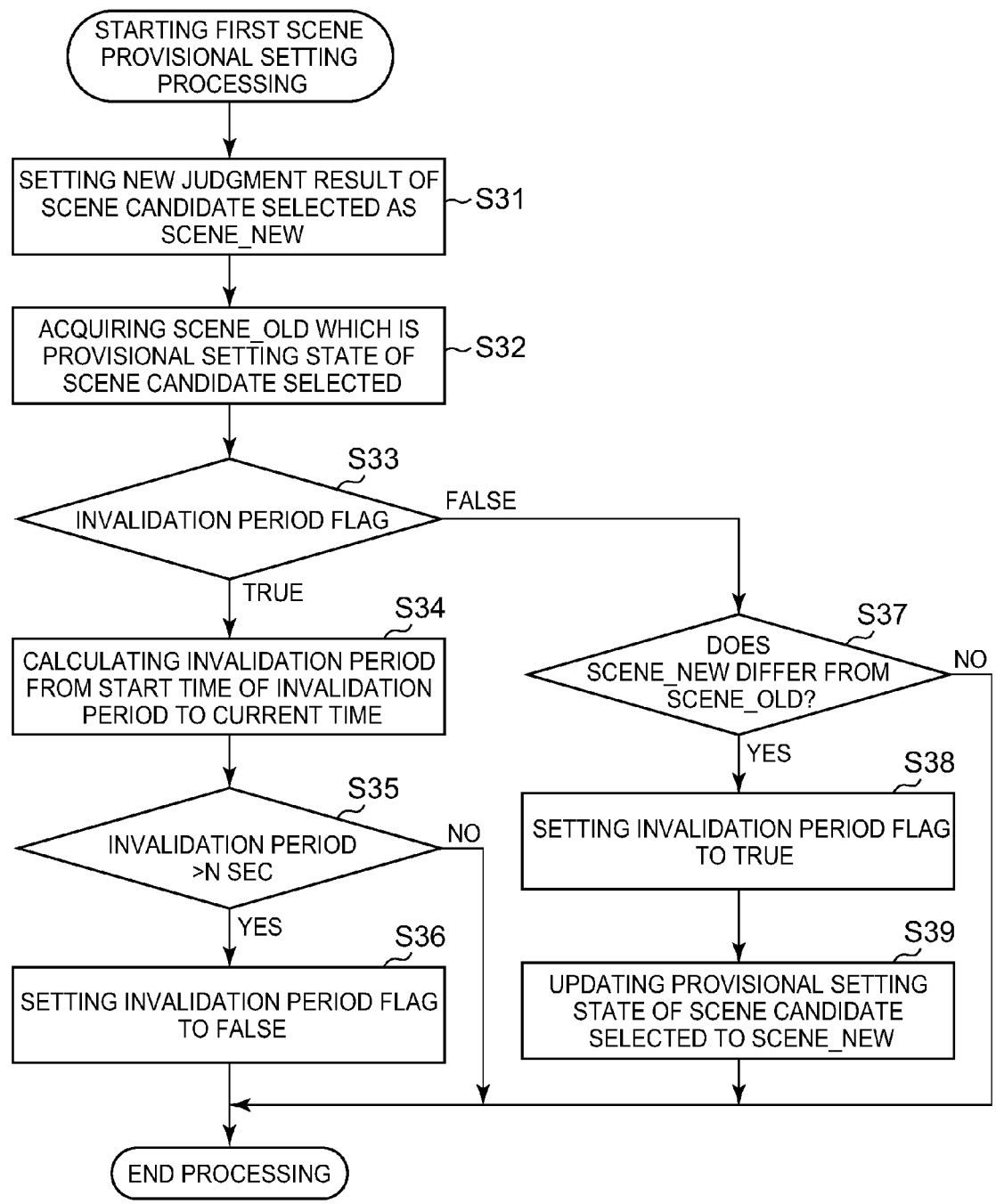
FIG. 8 is a flowchart showing a detailed flow of first scene provisional setting processing among the photographing processing of FIG. 7.

FIG. 8 is a flowchart showing a detailed flow of the first scene provisional setting processing among the photographing processing of FIG. 7.

In Step S31, the scene candidate acquisition unit 561 sets a new judgment result of the scene candidate selected as "Scene_new".

In Step S32, the scene candidate acquisition unit 561 acquires "Scene_old", which is a provisional setting state of the scene candidate selected.

In Step S33, the scene setting invalidation period management unit 562 judges whether a flag for the scene setting invalidation period is ON.

In a case of the flag for the scene setting invalidation period being ON, it is "TRUE" in Step S33 and the processing advances to Step S34.

In Step S34, the scene setting invalidation period management unit 562 calculates a period from the start time of the scene setting invalidation period to the current time.

In Step S35, the scene setting invalidation period management unit 562 judges whether the current time (N) exceeds the scene setting invalidation period.

In a case in which the current time (N) is during the scene setting invalidation period, it is judged as NO in Step S35 and the first scene provisional setting processing ends.

On the other hand, in a case in which the current time (N) exceeds the scene setting invalidation period, it is judged as YES in Step S35 and the processing advances to Step S36.

In Step S36, the scene setting invalidation period management unit 562 sets the scene setting invalidation period flag to "FALSE". Thereafter, the first scene provisional setting processing ends.

On the other hand, in Step S37, the provisional setting state update unit 563 judges whether "Scene_new" differs from "Scene_old".

If "Scene_new" is the same as "Scene_old", it is judged as NO in Step S37 and the first scene provisional setting processing ends.

On the other hand, if "Scene_new" is different from "Scene_old", it is judged as YES in Step S37, and the processing advances to Step S38.

In Step S38, the scene setting invalidation period management unit 562 sets the scene setting invalidation period flag to "TRUE".

In Step S39, the provisional setting state update unit 563 updates the provisional setting state of the scene candidate selected to "Scene_new". Subsequently, the first scene provisional setting processing ends.

Next, a flow of the second scene provisional setting processing among the photographing processing of FIG. 7 is explained.

FIG. 9 is a flowchart showing a detailed flow of the second scene provisional setting processing among the photographing processing of FIG. 7.

In Step S51, the scene candidate acquisition unit 561 sets a new judgment result of the scene candidate selected as "Scene_new".

In Step S52, the scene candidate acquisition unit 561 acquires "Scene_old" which is a provisional setting state of the scene candidate selected.

In Step S53, the provisional setting state update unit 563 judges whether "Scene_new" differs from "Scene_old".

If "Scene_new" is the same as "Scene_old", it is judged as NO in Step S54 and the second scene provisional setting processing ends.

On the other hand, if "Scene_new" is different from "Scene_old", it is judged as YES in Step S53, and the processing advances to Step S54.

In Step S54, the provisional setting state update unit 563 updates the provisional setting state of the scene candidate selected to "Scene_new". Then, the second scene provisional setting processing ends.

With the image capture apparatus 1, since the abovementioned image capture processing is executed, the live view display, the state display, and the photographic scene display are performed in a photographing standby state, whereby flickering on the screen display due to the photographic scene display changing is reduced and the inconsistency between the state display and the photographic scene display bringing about anxiety about operation reliability is not made.

As described above, the image capture apparatus 1 according to the present embodiment includes the scene judgment unit 55, the scene setting unit 56, and the scene display control unit 57.

The scene judgment unit 55 sequentially judges (estimates) a photographic scene by comparing a state of a plurality of judgment items sequentially detected with a judgment condition of each photographic scene.

The scene setting unit 56 sequentially sets a photographic scene that serves as a basis for judging a photographic condition based on the photographic scene sequentially estimated.

Furthermore, the scene judgment unit 55 controls, for each photographic scene, an update condition for determining an update timing of a photographic scene set or an update timing of a photographic scene displayed on the output unit 19.

The scene display control unit 57 controls the output unit 19 so as to sequentially display the scene identification information indicating the photographic scene set based on the photographic scene sequentially set.

With the image capture apparatus 1, when the relevancy with the state of a portion of the judgment items that serves as a target of the state display satisfies a predetermined condition, the update timing of the photographic scene can be changed.

With this configuration, it is possible to preferably set a timing or a condition relating to setting.

Furthermore, the judgment item detection unit 54 sequentially detects a state of a plurality of judgment items used for judging a photographic scene.

The live view display control unit 53 displays captured images that are sequentially captured by the image capture unit 17 on the live view screen of the output unit 19, while sequentially updating the images thereon.

The state display control unit 58 displays a detected state of a portion of the judgment items that serves as a target of the state display from among the plurality of judgment items on the live view screen, while sequentially updating the state thereon.

The scene display control unit 57 displays the scene identification information indicating the photographic scene on the live view screen, while sequentially updating the information thereon.

The scene judgment unit 55 sequentially estimates (judges) a photographic scene by comparing the states of a plurality of judgment items that are sequentially detected by the judgment item detection unit 54 with judgment conditions of each photographic scene.

The scene setting unit 56 changes, for each photographic scene, an update condition for determining an update timing of the photographic scene according to whether a judgment condition of each photographic scene satisfies a predetermined condition regarding relevancy with a state of a portion of the judgment items that serve as a target of the state display.

With this configuration, it is possible to preferably set a timing or a condition relating to setting.

The scene setting unit 56 changes, for each photographic scene, an update condition so that a photographic scene having a judgment condition with higher relevancy with a state of a portion of the judgment items that serve as a target for the state display is updated more quickly.

With such a configuration, it is possible to make the photographic scene display and the state display agree, a result of which it is possible to preferably set a timing or a condition relating to setting.

Furthermore, for a photographic scene having a judgment condition with high relevancy with a state of a portion of the judgment items that serve as a target for the state display, the scene setting unit 56 uses an update condition that inhibits the photographic scene switching within a predetermined time period, and for a photographic scene having a judgment condition with low relevancy with a state of a portion of the judgment items that serve as a target for the state display, the scene setting unit 56 uses an update condition that does not inhibit the photographic scene switching within a predetermined time period.

With such a configuration, for the target of the state display with low relevancy, it is ensured that display is changed after a predetermined time period, and for the target of the state display with high relevancy, it is possible to change display without a lapse of a predetermined time period.

With such a configuration, it is possible to make the photographic scene display and the state display agree, a result of which it is possible to preferably set a timing or a condition relating to setting.

Furthermore, the scene setting unit 56 judges that relevancy is high in a case in which only a state of a portion of the judgment items that serve as a target of the state display is set as a judgment condition.

With such a configuration, since it is possible to change display without a lapse of predetermined time period for a judgment item of a judgment condition of a photographic scene, it is possible to make the photographic scene display and the state display agree, a result of which it is possible to preferably set a timing or a condition relating to setting.

Furthermore, the scene judgment unit 55 sets a judgment condition of each photographic scene as a matter in which a state of the plurality of judgment items sequentially detected satisfies a specific condition corresponding to each photographic scene continues for at least a predetermined time period that is decided independently for each photographic scene.

With such a configuration, it is possible to combine a plurality of photographic scenes and perform the photographic scene display.

Furthermore, for an update condition for a plurality of photographic scenes having a judgment condition with low relevancy with a state of a portion of the judgment items that serve as a target for the state display, the scene setting unit 56 uses an update condition that inhibits a photographic scene switching within a predetermined time period that is determined in common with the plurality of photographic scenes.

With such a configuration, it is possible to combine a plurality of photographic scenes and perform the photographic scene display, and since each photographic scene display is not individually changed, it is possible to reduce flickering on a display screen.

The scene setting unit 56 sequentially updates a photographic scene that is set as criteria for determining a photographic condition with a timing at which a changing condition of photographic scenes that are sequentially estimated by the scene judgment unit 55 satisfies a predetermined update condition.

The scene setting unit 56 controls, for each photographic scene, an update condition for determining an update timing of the photographic scene set by the scene setting unit 56.

With such a configuration, it is possible to combine a plurality of photographic scenes to perform the photographic scene display, and since each photographic scene display is not individually changed, it is possible to reduce flickering on a display screen.

Furthermore, with the image capture apparatus 1, a portion of the judgment items that serve as a target of the state display is a detection of a face.

The scene judgment unit 55 judges a photographic scene of which the target is person, based on whether there is a face detected within images sequentially captured by the image capture unit 17.

The state display control unit 58 controls the output unit 19 so as to perform display showing a location of a face detected on the live view screen (the state display of face detection).

The scene setting unit 56 switches the photographic scene to be set more quickly in the case of switching between a photographic scene of which the target is person and another photographic scene, than a case of switching between photographic scenes of which target is not person.

With such a configuration, it is possible to judge a photographic scene of which the target is person based on whether there is a face detected, and to perform the state display of face detection in parallel with the switching of photographic scenes.

With such a configuration, it is possible to be make the photographic scene display and the state display agree, and also possible to assure the operation reliability to the user.

It should be noted that the present invention is not to be limited to the aforementioned embodiment, and that modifications, improvements, etc. within a scope that can achieve the object of the present invention are also included in the present invention.

In the abovementioned embodiment, although the state display with high relevancy is "face detection" of the judgment items upon the photographic scene of "person", the present invention is not limited thereto. For example, upon a photographic scene of "macro", it is possible to perform a state display with high relevancy by setting only "subject distance" for a judgment condition or by setting only "light source" for a photographic scene of "indoor" as a judgment condition.

Furthermore, in the abovementioned embodiment, although the detection of judgment items is performed by analyzing captured images, the present invention is not limited thereto. For example, the detection of judgment items may be performed by using various sensors.

Furthermore, in the abovementioned embodiment, with respect to the setting of an update condition for each photographic scene, although it is configured so that the display timing is delayed as a result of controlling the setting timing by setting the scene setting invalidation period, the present invention is not limited thereto. For example, it may be configured so as to delay the display timing based on a setting result. It can be configured so that an update condition is controlled for each photographic scene in any case and the display can be delayed.

Furthermore, in the abovementioned embodiment, although the image capture apparatus 1 to which the present invention is applied is explained with a digital camera as an example, the present invention is not limited thereto.

For example, the present invention can be applied to various electronic devices having a display function. More specifically, for example, the present invention can be applied to a lap-top personal computer, a television, a video camera, a portable navigation device, a cell phone device, a smart phone, a portable gaming device, and the like.

The processing sequence described above can be executed by hardware, and can also be executed by software.

In other words, the hardware configuration shown in FIG. 4 is merely an illustrative example, and the present invention is not particularly limited thereto. More specifically, the types of functional blocks employed to realize the above-described functions are not particularly limited to the example shown in FIG. 4, so long as the image capture device 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), Blu-ray Disc, an optical disk, a magnetic optical disk, or the like. The optical disk is composed of, for example, a CD-ROM (Compact Disk-Read Only Memory), a DVD (Digital Versatile Disk), Blu-ray Disc, or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

What is claimed is:

1. An image capture apparatus comprising:
   a scene estimate unit that sequentially estimates a photographic scene;
   a scene setting unit that, based on the photographic scene sequentially estimated, sequentially sets a photographic scene that serves as a basis for judging a photographic condition;
   a scene display unit that, based on the photographic scene sequentially set, sequentially displays scene identification information indicating the photographic scene being set;
   an update condition control unit that controls, for each photographic scene, an update condition for determining an update timing of the photographic scene set by the scene setting unit or an update timing of the photographic scene displayed by the scene display unit;
   a detection unit that sequentially detects states of a plurality of judgment items used for judging a photographic scene; and
   a judgment item display unit that displays on a live view screen of a display unit, while sequentially updating, a detected state of a portion of judgment items that serve as a target of a state display from among the plurality of judgment items;

wherein the scene estimate unit sequentially estimates the photographic scene by comparing the states of a plurality of judgment items that are sequentially detected by the detection unit with a judgment condition of each photographic scene, and wherein the update condition control unit changes, for each photographic scene, an update condition so that a photographic scene having a judgment condition with higher relevancy with a state of a portion of the judgment items that serve as a target for the state display is updated more quickly.

2. The image capture apparatus according to claim 1, further comprising:

a live view display unit that displays, while sequentially updating, captured images that are sequentially captured by the image capture unit on the live view screen of the display unit;

wherein the scene display unit displays, while sequentially updating, the scene identification information indicating the photographic scene on the live view screen.

3. The image capture apparatus according to claim 1, wherein:

for a photographic scene having a judgment condition with low relevancy with a state of a portion of the judgment items that serve as a target for the state display, the update condition control unit uses an update condition that forbids the photographic scene switching within a predetermined time period, and for a photographic scene having a judgment condition with high relevancy with a state of a portion of the judgment items that serve as a target for the state display, the update condition control unit uses an update condition that does not forbid the photographic scene switching within a predetermined time period.

4. The image capture apparatus according to claim 1, wherein the update condition control unit judges that relevancy is high in a case in which only a state of a portion of the judgment items that serve as a target of the state display is set as a judgment condition.

5. The image capture apparatus according to claim 1, wherein, for an update condition for a plurality of photographic scenes having a judgment condition with low relevancy with a state of a portion of the judgment items that serve as a target for the state display, the update condition control unit uses an update condition that inhibits a photographic scene switching within a predetermined time period that is determined in common with the plurality of photographic scenes.

6. The image capture apparatus according to claim 1, wherein the scene estimate unit sets, as a judgment condition of each photographic scene, an event of a state in which a state of the plurality of judgment items sequentially detected satisfies a specific condition corresponding to each photographic scene continuing for at least a predetermined time period that is decided independently for each photographic scene.

7. The image capture apparatus according to claim 1, wherein:

the scene setting unit sequentially updates a photographic scene that is set as criteria for determining a photographic condition at a timing at which a changing condition of photographic scenes that are sequentially estimated by the scene estimate unit satisfies a predetermined update condition, and the update condition control unit controls, for each photographic scene, an update condition for determining an update timing of the photographic scene set by the scene setting unit.

8. An image capture apparatus comprising:

a scene estimate unit that sequentially estimates a photographic scene;

a scene setting unit that, based on the photographic scene sequentially estimated, sequentially sets a photographic scene that serves as a basis for judging a photographic condition;

a scene display unit that, based on the photographic scene sequentially set, sequentially displays scene identification information indicating the photographic scene being set;

an update condition control unit that controls, for each photographic scene, an update condition for determining an update timing of the photographic scene set by the scene setting unit or an update timing of the photographic scene displayed by the scene display unit, a detection unit that sequentially detects states of a plurality of judgment items used for judging a photographic scene; and a judgment item display unit that displays on a live view screen of a display unit, while sequentially updating, a detected state of a portion of judgment items that serve as a target of a state display from among the plurality of judgment items, wherein:

the scene estimate unit sequentially estimates the photographic scene by comparing the states of a plurality of judgment items that are sequentially detected by the detection unit with a judgment condition of each photographic scene, a portion of the judgment items that serve as a target of the state display is a detection of a face, the scene estimate unit estimates a photographic scene of which a target is person based on whether there is a face detected within images sequentially captured by the image capture unit, and the update condition control unit switches a photographic scene that is set more quickly in a case of switching between a photographic scene of which a target is a person and another photographic scene, than in a case of switching between photographic scenes of which a target is not a person.

9. A display control method executed by an image capture apparatus including a display unit, the method comprising:

sequentially estimating a photographic scene;

sequentially setting, based on the photographic scene sequentially estimated, a photographic scene that serves as a basis for judging a photographic condition;

sequentially displaying, based on the photographic scene sequentially set, scene identification information indicating the photographic scene being set;

controlling, for each photographic scene, an update condition for determining an update timing of the photographic scene set by the scene setting unit or an update timing of the photographic scene displayed by the scene display unit;

sequentially detecting states of a plurality of judgment items used for judging a photographic scene; and displaying on a live view screen of a display unit, while sequentially updating, a detected state of a portion of judgment items that serve as a target of a state display from among the plurality of judgment items;

wherein the sequentially estimating the photographic scene comprises comparing the states of a plurality of judgment items that are sequentially detected with a judgment condition of each photographic scene, and wherein the controlling the update condition comprises changing, for each photographic scene, an update condition so that a photographic scene having a judgment condition with higher relevancy with a state of a portion of the judgment items that serve as a target for the state display is updated more quickly.

10. A display control method executed by an image capture apparatus including a display unit, the method comprising:
sequentially estimating a photographic scene;
sequentially setting, based on the photographic scene sequentially estimated, a photographic scene that serves as a basis for judging a photographic condition;
sequentially displaying, based on the photographic scene sequentially set, scene identification information indicating the photographic scene being set;
controlling, for each photographic scene, an update condition for determining an update timing of the photographic scene set by the scene setting unit or an update timing of the photographic scene displayed by the scene display unit;
sequentially detecting states of a plurality of judgment items used for judging a photographic scene; and
displaying on a live view screen of a display unit, while sequentially updating, a detected state of a portion of judgment items that serve as a target of a state display from among the plurality of judgment items,
wherein:
the sequentially estimating the photographic scene comprises comparing the states of a plurality of judgment items that are sequentially detected by the detection unit with a judgment condition of each photographic scene,
a portion of the judgment items that serve as a target of the state display is a detection of a face,
the sequentially estimating the photographic scene further comprises estimating a photographic scene of which a target is person based on whether there is a face detected within images sequentially captured by the image capture unit, and
the controlling the update condition comprises switching a photographic scene that is set more quickly in a case of switching between a photographic scene of which a target is a person and another photographic scene, than in a case of switching between photographic scenes of which a target is not a person.

* * * * *